2,912,306

METHOD OF PRODUCING MAGNESIA AND CALCIUM NITRATE FROM DOLOMITE

Otto Kippe, Osnabruck, Germany, assignor of one-half to Paul O. Tobeler, doing business as Trans-Oceanic, Los Angeles, Calif.

No Drawing. Application September 13, 1957
Serial No. 683,692

4 Claims. (Cl. 23—201)

This invention concerns generally the recovery of magnesia from dolomite rock, and more particularly has to do with a method for economically obtaining a relatively pure substantially lime-free magnesia from both amorphous and crystalline forms of dolomite. The present application is a continuation in part of my prior application entitled "Method of Producing Magnesia and Calcium Nitrate from Dolomite," Serial No. 510,059, filed May 20, 1955, and now abandoned.

An important commercial method for treating dolomite to secure separation of the magnesia from the lime content thereof, and involving a conversion of the latter into valuable nitrate for use as fertilizer, includes the treatment of dolomite with nitric acid together with calcined or burned dolomite, as indicated by the following equation:

(1)  $CaCO_3 \cdot MgCO_3 + 4HNO_3 = Ca(NO_3)_2$
$\qquad + Mg(NO_3)_2 + 2H_2O + 2CO_2$ (2)  $Ca(NO_3)_2 + Mg(NO_3)_2 + CaO \cdot MgO$
$\qquad + 2H_2O = 2Mg(OH)_2 + 2Ca(NO_3)_2$ After such treatment, the insoluble magnesium hydroxide in an impure form is separated as by filtering and subsequently washed and dried to produce magnesia according to the following equation:

(3) $\qquad Mg(OH)_2 = MgO + H_2O$

The above commercial method for separating magnesia from dolomite is found somewhat objectionable in that the magnesia contains an undesirably high proportion of calcium oxide, e.g. about 15% CaO by weight resulting from the precipitation of the magnesium hydroxide, while industry requests under 4% CaO in magnesia. In attempting to increase the purity of the magnesia yield, dolomite milk from which coarse particles have been removed, as by sieving, has been substituted for burned dolomite in the treatment of the solution of raw dolomite in nitric acid, according to the following equation:

(4)  $Ca(NO_3)_2 + Mg(NO_3)_2 + Ca(OH)_2 \cdot Mg(OH)_2$
$\qquad = 2Mg(OH)_2 + 2Ca(NO_3)_2$ It was found that while this method led to reduction of the lime content in the magnesia yield, the required time for filtering the magnesium hydroxide was undesirably increased and a relatively poor yield of calcium nitrate, i.e. a too dilute calcium nitrate solution, was obtained, so that considering the whole process, the resulting disadvantages offset the realized advantages.

Another approach to the problem of obtaining a relatively pure magnesia yield involved the treatment of the solution of dolomite in nitric acid with a small quantity of ammonia together with burned dolomite, as described in U.S. Patent No. 1,975,954. This method raised the purity of the magnesia yield when amorphous dolomite was used, but failed when the process was applied to crystalline dolomite, the calcium oxide content of the magnesia derived from crystalline dolomite being approximately 5%. In addition, increased filtering time was required to separate the magnesium hydroxide when crystalline dolomite was used.

It has now been discovered that, in accordance with the present invention, recovery of magnesia in industrially desirable lime-poor form, i.e. having under 2.0% calcium oxide content, from both amorphous and crystalline forms of dolomite is made possible by first dry slaking the burned dolomite, to be combined with the solution of raw dolomite in nitric acid, with an aqueous calcium nitrate solution. It was found that slaking burned dolomite only with water results in the disintegration of the dolomite into very fine soft powder which, in the reaction with a solution of dolomite in nitric acid, results in the formation of a magnesium hydroxide, the filtering of which is commercially impractical as being too time consuming. On the other hand, according to the present process, dry slaking of burned dolomite with a relatively weak calcium nitrate solution results in the formation of a gritty hydrate comprising hard, dry granules which pass almost without residue through a 0.5 mm. mesh sieve. When this hydrate is reacted with a solution of dolomite in nitric acid, the magnesium hydroxide yield not only is extremely lime poor, but is easily and quickly filterable. Apparently, the calcium nitrate in the slake solution has the effect of quickening the hydration of the lime in the burned dolomite while retarding the hydration of its magnesia content.

After sieving or screening the hydrate granules as described above, the latter are introduced or combined with the solution of raw dolomite in nitric acid, which may be treated with ammonia to increase the disintegration of the dolomitic material. After a few minutes the precipitated magnesium hydroxide is separated and washed, the separation being quickly accomplished by filtering. Following drying of the hydroxide, it is found that the purity of the resultant magnesia is substantially improved, the lime content thereof being significantly reduced, i.e. being under 2.0%. If ammonia is added, the purity of the magnesia is enhanced still further.

It is found that the calcium nitrate content of the aqueous calcium nitrate solution used in treating burned dolomite should be between about 8 and 12 percent. Furthermore for best results, proportionally between 40 and 50 liters of the calcium nitrate solution should be added to 100 kg. of burned dolomite to produce the dry hydrate granules. These amounts are critical to the production of magnesium hydroxide that is easily filterable and has less than 2% calcium oxide content. The economy of the overall process may be increased by utilizing as the calcium nitrate solution the wash waters resulting from washing the separated magnesium hydroxide, since these waters contain around 8 percent calcium nitrate. This percentage is raised during the dry slaking step since some of the water evaporates as a result of the exothermic reaction associated with slaking.

A variation of the above described process giving equally favorable results comprises first grinding the burned dolomite to about 0.5 mm. particle or granular size and thereafter suspending the ground dolomite in the calcium nitrate solution of the proportions indicated to produce the dry hydrate granules. This suspension is then utilized in the manner described above.

Example 250 grams of raw dolomite are dissolved in 760 cm.³ nitric acid (1.23). Meanwhile, 120 grams of burned dolomite are slaked with 60 cm.³ calcium nitrate solution (1.1) and thereupon the gritty hydrate sieved through an 0.5 mm. sieve. The dry hydrate passing through the sieve is added to the solution of dolomite in nitric acid, and then further disintegrated with 100 cm.³ ammonia (25%). After 15 minutes the precipitated magnesium hydroxide is separated by means of a suction filter and washed with 650 cm.³ water. The filtering time requires only about 7 minutes. The pure cake is then dried and calcined, the resulting magnesia having a calcium oxide content of about 1.46%.

I claim:
1. The process for producing lime deficient magnesia from dolomite, that includes dry slaking burned dolomite with a dilute aqueous solution of calcium nitrate in the proportions 40 to 50 liters of the calcium nitrate solution to 100 kilograms of burned dolomite to produce hard, dry hydrate granules containing hydrated lime and magnesia, said burned dolomite being selected from the group consisting of crystalline and amorphous burned dolomite, said dilute aqueous solution of calcium nitrate having a concentration of from 8 to 12 percent calcium nitrate, reacting said dry granules with a mother solution of raw dolomite in nitric acid to precipitate magnesium hydroxide and to dissolve the lime content of said granules in said mother solution, said raw dolomite being selected from the group consisting of crystalline and amorphous raw dolomite, separating said precipitate from said mother solution by filtration, aqueously washing said precipitate, and drying and calcining said precipitate to produce said magnesia, said product magnesia having less than 2.0% calcium oxide content.

2. The process of claim 1 including reacting said granules with said mother solution in the presence of ammonia to increase the purity of said magnesia.

3. The process of claim 2 including screening said hydrate granules to obtain granules of a size smaller than about 0.5 millimeter, and reacting only said smaller granules with said mother solution.

4. The process of claim 3 in which the burned dolomite is reacted with the calcium nitrate solution resulting from aqueously washing said precipitate.

References Cited in the file of this patent
UNITED STATES PATENTS

| | | |
|---|---|---|
| 1,904,946 | Kippe | Apr. 18, 1933 |
| 1,975,954 | Kippe | Oct. 9, 1934 |

OTHER REFERENCES

Schallis: Bureau of Mines Information Circular No. I.C. 7247 entitled Economic Considerations in the Recovery of Magnesia from Dolomite, August 1943; page 17 relied on.